United States Patent [19]

Tsao

[11] Patent Number: 4,765,398
[45] Date of Patent: Aug. 23, 1988

[54] VAPORIZATION OF LIQUIDS

[75] Inventor: Utah Tsao, Jersey City, N.J.

[73] Assignee: Lummus Crest, Inc., Bloomfield, N.J.

[21] Appl. No.: 46,316

[22] Filed: May 6, 1987

[51] Int. Cl.[4] .............................................. F22B 1/00
[52] U.S. Cl. .................................... 165/110; 165/108; 165/114; 122/34; 122/32
[58] Field of Search ....................... 165/110, 114, 108; 122/32, 34; 60/649

[56] References Cited

U.S. PATENT DOCUMENTS

| Re. 13,117 | 5/1910 | Kestner | 122/34 |
| 971,395 | 9/1910 | Morris | 122/34 |
| 2,718,215 | 9/1955 | Eckstrom | 122/34 |

Primary Examiner—Albert W. Davis, Jr.
Attorney, Agent, or Firm—Elliot M. Olstein; John N. Bain; John G. Gilfillan

[57] ABSTRACT

Two immiscible liquids are vaporized in heat exchanger tubes in a manner such that each tube receives both liquids and neither liquid is completely vaporized in the tubes.

8 Claims, 1 Drawing Sheet

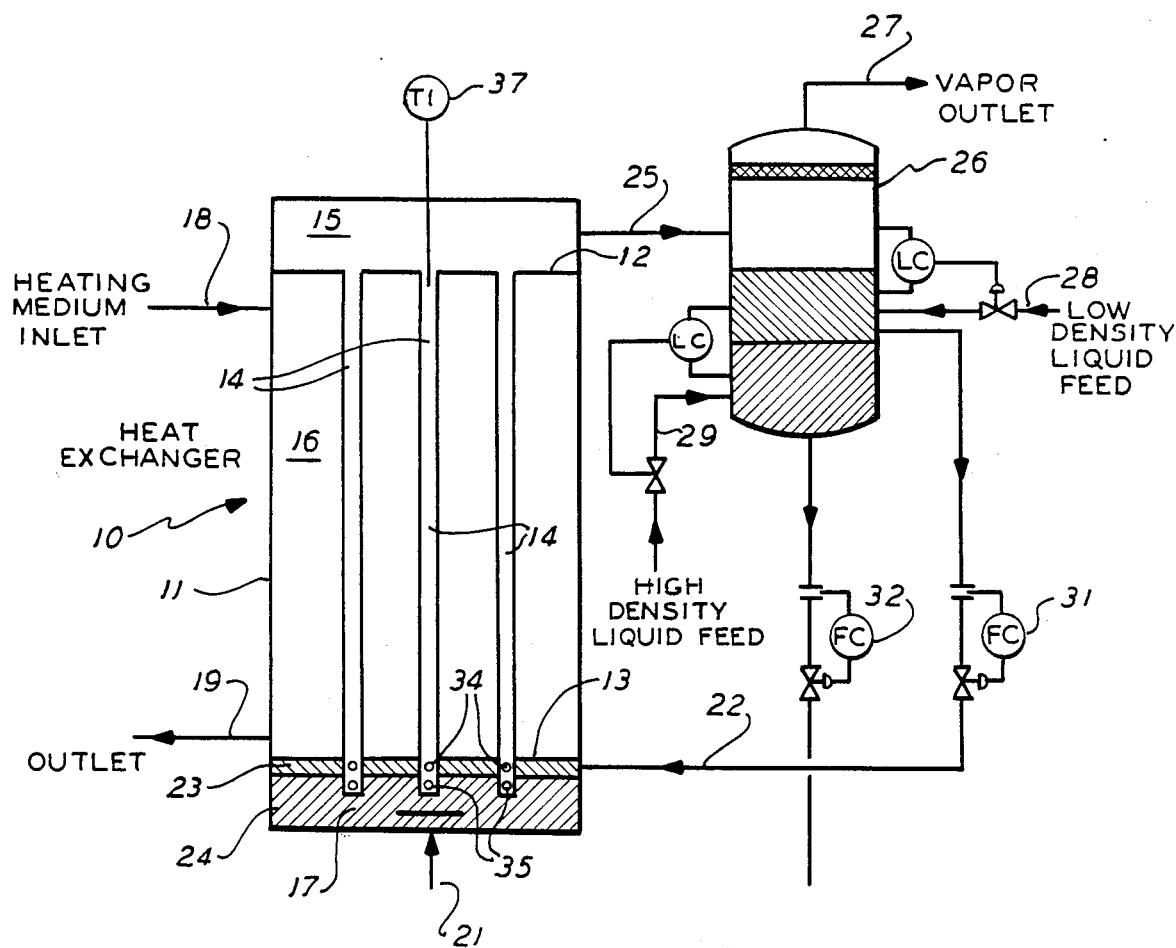

VAPORIZATION OF LIQUIDS

This invention relates to the vaporization of liquids, and more particularly to a process and apparatus for the vaporization of immescible liquids.

In many cases, it is necessary to vaporize liquids which are to be employed in a chemical process in vapor form. In general, the liquids are separately vaporized, and the vapors combined for use in a chemical process.

For example, in the production of styrene from ethylbenzene, the feed to the reactor includes both ethylbenzene and water, with ethylbenzene and water being immiscible with each other. In many cases, in order to provide both ethylbenzene and water as a vapor feed, the ethylbenzene and water are separately vaporized and combined prior to being employed in the process.

Similarly, in thermal cracking processes, a hydrocarbon feed, in vapor form, and steam are combined with each other, prior to being introduced into the cracking heater, with the hydrocarbon and water being vaporized and separate operations.

In accordance with the present invention, at least two liquids, which are immiscible with each other, are simultaneously vaporized in order to provide a vaporized mixture of at least two immiscible liquids.

More particularly, at least two liquids which are immiscible with each other are introduced into the tube side of a heat exchanger containing at least two tubes with the liquid being heated in the tubes to a temperature sufficient to vaporize the at least two liquids, with the at least two liquids being introduced into each of the tubes in amounts such that neither of the at least two liquids is completely vaporized in the tubes.

Applicant has found that immiscible liquids may be vaporized in admixture with each other in the tubes of a heat exchanger at improved heat transfer efficiency, provided that over the length of the tubes in which the liquids are being vaporized at least a portion of each of the liquids is present in liquid form; i.e., each of the liquids in each of the tubes is not completely vaporized.

In the vaporization of two immiscible liquids, the boiling point of the mixture is lower than that of either of the components; accordingly, by ensuring that each of the immiscible liquids which is to be vaporized in the tubes is not completely vaporized in the tubes, vaporization can be achieved at a lower temperature which maximizes the temperature difference between the heat transfer medium and the boiling temperature of the liquid mixture. In this manner, the required heating surface can be reduced or more heat can be recovered from the heat transfer medium.

Still more particularly, a liquid mixture containing at least two liquids which are immiscible which each other is passed upwardly through a plurality of tubes in a heat exchanger, with the tubes being heated by a heat transfer medium to a temperature sufficient to effect vaporization of the liquid mixture, with the liquid mixture being introduced into each of the tubes in a manner and amounts such that each of the tubes includes the at least two immiscible liquids, and in each of the tubes, neither of the at least two immiscible liquids is completely vaporized.

In accordance with a further aspect of the present invention, there is provided a heat exchanger for vaporizing a liquid mixture containing at least two immiscible liquids wherein the heat exchanger includes a plurality of heat exchanger tubes (a tube bundle) which extend vertically between spaced tube sheets, with the tubes having an inlet in fluid flow communication with an inlet compartment and an outlet in fluid flow communication with an outlet compartment.

The inlet end of the tubes extend into the inlet compartment, with the inlet compartment being provided with a first inlet for introduction of a first immiscible liquid, and a second inlet for introduction of a second immiscible liquid.

The inlet ends of the tubes are provided with inlet control means for controlling introduction of the first and second liquids into each of the plurality of tubes in a manner such that each of the tubes is provided with both the first and second liquids and, in each of the tubes, neither of the first and second liquids is completely vaporized in passage from the inlet compartment to the outlet compartment.

The outlet compartment is further provided with an outlet means for withdrawing the vaporized and unvaporized liquids, with both the vapor phase and the liquid phase containing each of the first and second liquids.

The tube inlet means at the inlet ends of the tubes for controlling the introduction of the at least two liquids in a manner such that both of the liquids enter each of the the tubes for upward passage through the tubes to the outlet compartment may take a variety of forms. For example, the tubes may be closed at the inlet ends, and the periphery of the inlet ends of the tubes would be provided with vertically spaced holes positioned above and below the liquid interface or a vertical slot extending above and below the liquid interface.

In this manner, each of the immiscible liquids may be independently introduced into each of the tubes in amounts such that in each of the tubes neither of the two liquids is completely vaporized.

In general, the liquid mixture which is introduced into the heat exchanger for vaporization therein contains two liquids which are immiscible with each other; however, it is to be understood that more than two liquids may be included in the liquid mixture, provided there are at least two liquids which are immiscible with each other.

Although in describing the present invention, it is stated that the heat exchanger contains at least two tubes, in most cases, the heat exchanger contains a plurality of tubes.

The present invention will be further described with respect to the accompanying drawing wherein:

The drawing is a simplified schematic representation of a preferred embodiment of the present invention.

Referring now to the drawing, there is shown a heat exchanger generally designated at 10 which is comprised of a heat exchanger shell 11, an upper tube sheet 12, a lower tube sheet 13 and a plurality of heat transfer tubes 14 which extend between the upper tube sheet 12 and the lower tube sheet 13 and which are supported thereby.

The tube sheets 12 and 13 in combination with the heat exchanger shell 11 define an upper outlet compartment 15, an intermediate heat transfer compartment 16 and a lower inlet compartment 17.

The heat transfer compartment 16 is provided with an inlet 18 for introducing a suitable heat transfer medium into the shell side of the exchanger 10 and an outlet 19 for withdrawing the heat transfer medium from the lower portion of the shell side of the heat transfer compartment 16. In this manner, the heat transfer medium flows counter-currently to the material to be vaporized in the tubes 14. The inlet compartment 17 is provided with a first inlet 21 for introducing the heavier of the at least two immiscible liquids to be vaporized in the heat exchanger 10 and an inlet 22 for introduction of the lighter of the at least two liquids to be vaporized in the heat exchanger 10.

The two immiscible liquids form a light liquid phase designated as 23 (first liquid), and a heavier liquid phase designated as 24 (second liquid) in the inlet compartment 17 of the heat exchanger 10. The inlet ends of the tubes 14 extend into the inlet compartment 17 (the tubes extend below the tube sheet 13), and the inlet ends of the tubes are provided with a suitable inlet control means for ensuring that each of the first and second liquid phases 23 and 24, respectively, is introduced into each of the tubes 14 in amounts such that in upward passage through each of the tubes 14 neither of the first and second liquids 23 and 24 is completely vaporized in the tubes 14. As particularly shown, the inlet control means for each of the tubes 14 is in the form of two vertically spaced holes 34 and 35 on the periphery of the tubes 14, with the ends of the tubes being closed, whereby liquid is introduced into the interior of the tubes 14 only through the holes. The hole 34 is above the interface between the two immiscible liquids and the hole 35 is below the interface.

As an alternative embodiment of an inlet control means, the periphery of each of the tubes 14 may be provided with a vertical slot, with the inlet ends of the tubes being closed, with the slot extending above and below the interface of the two liquids, whereby liquid is introduced into the interior of the tubes 14 only through the vertical slot in the periphery of the inlet ends of the tubes 14.

In this manner, each of the two liquids may be separately and independently introduced into each of the tubes to insure that each of the liquids is present in the tubes in amounts whereby neither of the liquids is completely vaporized in the tubes.

The spacing and sizing of the slot or holes is selected to insure that there is flow of both liquids into and up through the tubes.

The outlet compartment 15 of the heat exchanger is provided with an outlet line 25 for passing a vapor-liquid mixture to a knock-out drum generally indicated as 26. The vapor-liquid mixture in line 25 contains each of the immiscible liquids 23 and 24 as well as the vaporized form of each of the immiscible liquid 23 and 24.

The knock-out drum 26 is provided with a vapor outlet 27, as well as lines 22 and 21 for passing the lighter and heavier liquids 23 and 24, respectively, from the knock-out drum to the inlet compartment 17 of the heat exchanger 10. The knock-out drum is further provided with an inlet line 28 for introduction of the lighter liquid feed into the knock-out drum 26, and a line 29 for introduction of the heavier liquid feed to the knock-out drum 26.

The lines 21 and 22 are provided with suitable flow controllers 31 and 32, respectively, for controlling the rate of introduction of the lighter and heavier liquids into the inlet compartment of the exchanger 10.

The rate of introduction of the heavier and lighter liquid feeds through lines 21 and 22, respectively, is controlled to provide a steady state level of introduction of each of the liquids into the inlet compartment 17 of the exchanger 10 such that under the influence of the inlet control means there is sufficient amounts of each of the liquids available in the inlet compartment 17 to insure that in each of the tubes 14 neither of the liquids is completely vaporized.

The level of the liquid introduced into the heat exchanger is adjusted in accordance with the temperature indicated by a temperature indicator 37 positioned in the top of tubes 14. When the liquid level in the inlet compartment 17 is raised to a point that all of the low density liquid is vaporized in the tubes, the temperature in the top end of the tubes 14 will suddenly rise. The liquid level in the inlet compartment is set below the point at which there is a sudden increase in the temperature in the top of the tubes 14. As should be apparent, the temperature indicator 37 is a schematic representation, and is representation of several temperature indicators in the top ends of tubes 14 to insure the presence of both liquids in the tops of tubes 14.

In operation, a heat transfer medium is introduced through line 18 at a temperature which is sufficient to heat the liquid mixture comprised of liquids 23 and 24, which is in tubes 14 to the vaporization temperature of the mixture. A vapor-liquid mixture enters outlet compartment 15, and is introduced into the knock-out drum 26 through line 25, wherein vapor is separated from the unvaporized liquid.

The inlet control means at the inlet ends of the tubes 14 operates to insure that each of the tubes 14 includes each of the liquids 23 and 24 in amounts such that neither liquid 23 nor liquid 24 is completely vaporized in upward passage through the tube 14.

Applicant has found that by providing such a flow control means and upward flow through the tubes 14 it is possible to insure that each of the tubes 14 operates to vaporize liquid, as hereinabove described, even though there may be movement of the level of the interface (height of the interface) over the cross-section of the heat exchanger compartment 17. Thus, for example, if the vertical exchanger 10 is slightly inclined, the height of the interface will vary over the cross-section of the inlet compartment 17, and in the absence of the flow control means, as hereinabove described, each of the tubes 14 will not receive each of the liquids 23 and 24 in amounts such that neither of the the liquids 23 and 24 is completely vaporized during upward passage through the tubes 14.

Applicant has found that two immiscible liquids may be more efficiently vaporized by passing a mixture of the two liquids upwardly through the tubes of a vertical heat exchanger provided that the heat exchanger is designed and operated in a manner such that each of the tubes in the exchanger receives each of the immiscible liquids in amounts such that each of the liquids is vaporized in the tubes 14; however, neither of the two liquids is completely vaporized in any of the tubes.

As hereinabove indicated, the present invention is applicable to vaporization of a wide variety of immiscible liquids. Thus, for example by way of illustration the heat exchanger may be employed for vaporizing a mixture of ethylbenzene and water; a mixture of water and a hydrocarbon to be employed as a cracking feedstock, etc.

Similarly the present invention is not limited to the embodiment described in the drawings. For example, a heat exchanger may be provided which is comprised of a tube bank and inlet and outlet compartments without a shell. In such an embodiment, for example, the heat exchanger may be placed in the top of a vacuum distillation tower whereby the exposed tubes are heated by the tower overhead, resulting in vaporization of the liquids in the tubes and condensation of tower overhead. These and other modifications should be apparent to those skilled in the art from the teachings herein.

Numerous modifications and variations of the present invention are possible in light of the above teachings and, therefore, within the scope of the appended claims, the invention may be practiced otherwise then as particularly described.

What is claimed is:

1. A process for vaporizing a liquid mixture containing at least two immiscible liquids, comprising:

introducing a liquid mixture containing at least two immiscible liquids into at least two tubes; heating said liquid mixture in the at least two tubes to a temperature sufficient to effect vaporization of a poriton of the mixture;

and introducing the liquid mixture into each of the tubes in amounts such that each of the tubes receives each of the at least two immiscible liquids and neither of the at least two immiscible liquids is completely vaporized in any of the at least two tubes.

2. The process of claim 1 wherein the at least two tubes are vertical tubes in a vertical heat exchanger, and the liquid mixture is upwardly passed through the at least two vertical tubes.

3. The process of claim 1 wherein the immiscible liquids are comprised of ethyl benzene and water.

4. The process of claim 1 wherein the immiscible liquids are comprised of a hydrocarbon and water.

5. A heat exhanger for vaporizing a mixture containing at least first and second liquids which are immiscible with each other, comprising:

an inlet compartment; an outlet compartment; a plurality of vertical tubes having an inlet in fluid flow communication with the inlet compartment and an outlet in fluid flow communication with the outlet compartment, said tubes extending into said inlet compartment; a first inlet means for introducing a first liquid into the inlet compartment; a second inlet means for introducing a second liquid into the inlet compartment, said first and second liquids being immiscible with each other; and inlet control means on the tubes for controlling introduction of the first and second liquids into the tubes to provide both first and second liquids within each of the tubes in amounts such that neither of the first and second liquids is completely vaporized in any of the tubes during vaporization of the liquid mixture.

6. The heat exchanger of claim 5 wherein the ends of the tubes in the inlet compartment are closed and the inlet control means is comprised of at least one hole in the periphery of each of the tubes above the interface of the first and second liquids in the inlet compartment and at least one hole in the periphery of each of the tubes below the interface of the first and second liquids in the inlet compartment.

7. The heat exchanger of claim 5 wherein the ends of the tubes in the inlet compartment are closed and the inlet control means is comprised of at least one vertical slot in the periphery of each of the tubes which extends above and below the interface of the first and second liquids in the inlet compartment.

8. The heat exchanger of claim 5 wherein the heat exchanger further comprises a shell.

* * * * *